(12) United States Patent
Namioka (10) Patent No.: US 8,068,173 B2
(45) Date of Patent: Nov. 29, 2011

(54) COLOR DIFFERENCE SIGNAL FORMAT CONVERSION DEVICE AND METHOD

(75) Inventor: Toshiyuki Namioka, Tokorozawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/797,427

(22) Filed: Jun. 9, 2010

(65) Prior Publication Data

US 2011/0075028 A1    Mar. 31, 2011

(30) Foreign Application Priority Data

Sep. 30, 2009   (JP) ................................. 2009-228136

(51) Int. Cl.
*H04N 7/01* (2006.01)
(52) U.S. Cl. ....................................................... 348/453
(58) Field of Classification Search .................. 348/441, 348/448, 452, 453, 458, 459, 443, 445, 447, 348/450; 345/603, 604, 606; 382/300, 298, 382/275
See application file for complete search history.

(56) References Cited

U.S. PATENT DOCUMENTS

| | | | | |
|---|---|---|---|---|
| 5,825,429 A * | 10/1998 | Shirahata | ....................... | 348/448 |
| 6,040,869 A * | 3/2000 | Dischert | ....................... | 348/448 |
| 6,094,226 A * | 7/2000 | Ke et al. | ....................... | 348/446 |
| 6,795,123 B2 * | 9/2004 | Gotanda et al. | ............... | 348/448 |
| 7,057,664 B2 * | 6/2006 | Law et al. | ....................... | 348/448 |
| 7,061,538 B2 * | 6/2006 | Kondo et al. | ................. | 348/453 |
| 7,113,221 B2 * | 9/2006 | Law et al. | ....................... | 348/448 |
| 7,242,819 B2 * | 7/2007 | Jiang | ............................. | 382/300 |
| 7,280,155 B2 * | 10/2007 | Law et al. | ....................... | 348/448 |
| 7,408,587 B2 * | 8/2008 | Matsutani et al. | ............ | 348/441 |
| 7,711,209 B2 * | 5/2010 | Kimura | ......................... | 382/300 |

FOREIGN PATENT DOCUMENTS

| | | |
|---|---|---|
| JP | 10-145817 | 5/1998 |
| JP | 2005-175590 | 6/2005 |
| JP | 2008-011389 | 1/2008 |
| JP | 2008-125119 | 5/2008 |
| JP | 2008-236622 | 10/2008 |
| JP | 2009-038578 | 2/2009 |
| JP | 2009-177524 | 8/2009 |
| JP | 2009-246929 | 10/2009 |
| JP | 2010-035157 | 2/2010 |
| JP | 2010-093672 | 4/2010 |
| WO | WO-99/59345 | 11/1999 |
| WO | WO-2005/055590 | 6/2005 |

* cited by examiner

*Primary Examiner* — Paulos Natnael
(74) *Attorney, Agent, or Firm* — Patterson & Sheridan, LLP (57) ABSTRACT

According to one embodiment, an IP converter converts an interlaced color difference signal, in which the number of pixels in a vertical direction of a color difference signal is half that of a luminance signal, into a progressive color difference signal. A diagonal correlation detector detects a diagonal correlation of the progressive color difference signal, and obtains a correlative direction detected signal. A controller outputs a field selection signal to determine whether the progressive color difference signal is a signal in a top or bottom field. And a pixel generator changes a ratio between pixels of an $n^{th}$ and an $n+1^{th}$ line of the progressive color difference signal according to the field selection signal, when generating a new pixel by using corresponding pixels of the $n^{th}$ and $n+1^{th}$ lines based on the correlative direction detected signal.

9 Claims, 8 Drawing Sheets

Example of generation of pixels in top field output

FIG. 6

Example of generation of pixels in bottom field output

COLOR DIFFERENCE SIGNAL FORMAT CONVERSION DEVICE AND METHOD

CROSS-REFERENCE TO RELATED APPLICATIONS

This application is based upon and claims the benefit of priority from Japanese Patent Application No. 2009-228136, filed Sep. 30, 2009; the entire contents of which are incorporated herein by reference.

FIELD

Embodiments described herein relate generally to a color difference signal format conversion device and method.

BACKGROUND

An image processing apparatus uses a technique of converting the format of a color difference signal, which increases the number of pixels of color difference signals per one screen to the same as that of a luminance signal in a vertical or horizontal direction (refer to Jpn. Pat. Appln. KOKAI Publication No. 2008-236622).

This patent application discloses a technique of converting Moving Picture Experts Group (MPEG) 4:2:0 format (luminance signal horizontal-to-vertical pixel ratio 480:720; color difference signal horizontal-to-vertical pixel ratio 240:360) to 4:2:2 format (luminance signal horizontal-to-vertical pixel ratio 480:720; color difference signal horizontal-to-vertical pixel ratio 480:360).

In digital television broadcasting, a digital television signal is transmitted in an interlaced format in most cases. In the 4:2:2 format, a pixel position of a color difference signal basically has a phase offset in the vertical direction with respect to a pixel position of a luminance signal. Thus, when the 240:360 horizontal-to-vertical pixel ratio is simply converted to the 480:360 ratio to convert the format, the phase offset is disturbed. As a result, a color shift may occur in a color picture on a screen. A disturbed phase offset of a color difference signal has a great influence on the color picture of a display unit using a 4:2:2 format interlaced signal.

DETAILED DESCRIPTION

In general, according to one embodiment, there is provided a color difference signal format conversion device and method configured to correct a phase offset of pixels of a color difference signal, when the format of a color difference signal is converted.

In an embodiment of the invention, an interlaced-to-progressive (IP) converter converts an interlaced color difference signal, whose number of pixels in a vertical direction is half that of a luminance signal, into a progressive color difference signal. A diagonal correlation detector detects a diagonal correlation of the progressive color signal, and obtains a correlative direction detected signal. A controller outputs a field selection signal identifying a field of the progressive color difference signal. A pixel generator changes the ratio between pixels of an $n^{th}$ and an $n+1^{th}$ line of the progressive color difference signal according to the field selection signal, when generating a new pixel by adding corresponding pixels of the $n^{th}$ and $n+1^{th}$ lines based on the correlative direction detected signal.

The embodiment of the invention corrects a phase offset of a luminance signal, when converting a color difference signal format, and obtains an appropriate pixel after conversion, thereby improving the quality of a color image.

The embodiment of the invention will be more specifically explained hereinafter.

Figure 1:
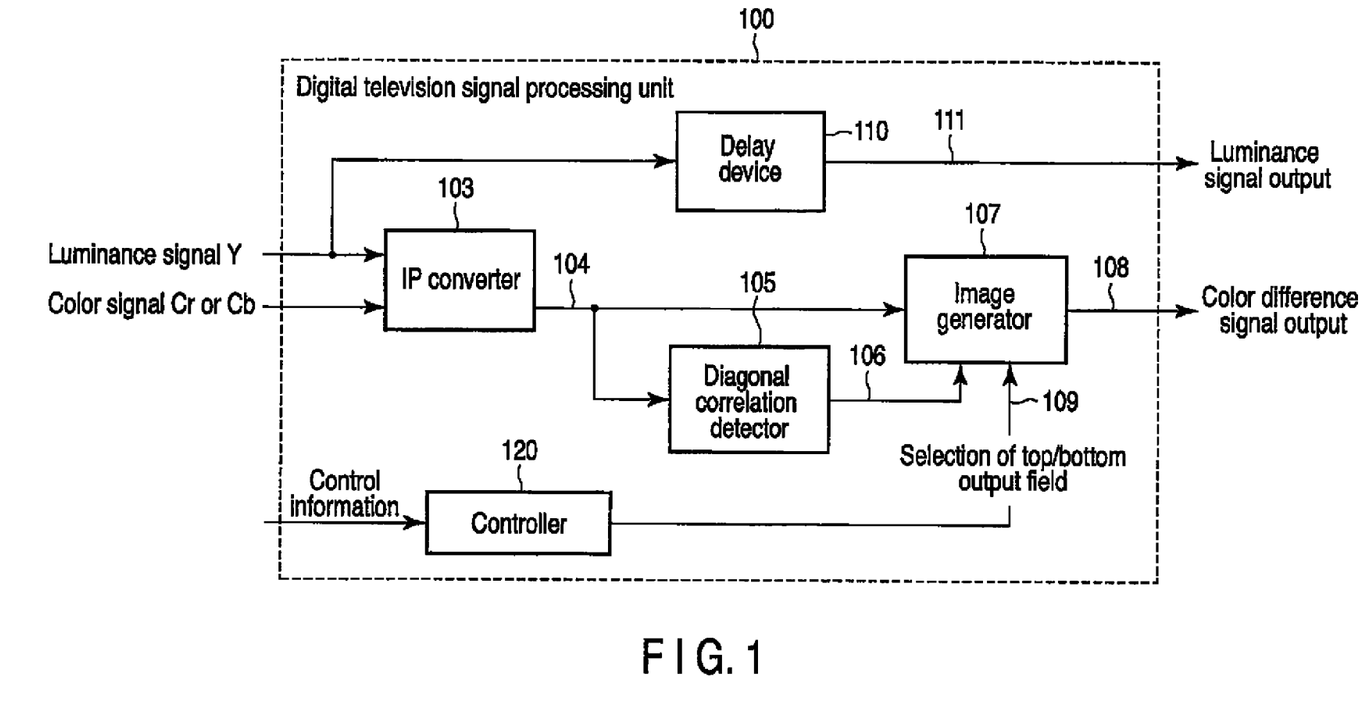
FIG. 1 shows a configuration of a color difference signal format conversion device according to an embodiment of the invention, in a digital television signal processing circuit.

In FIG. 1, a 4:2:0 interlaced signal obtained by decoding an MPEG signal is input to an interlaced-to-progressive converter 103. The 4:2:0 interlaced signal consists of a luminance signal Y, and a color difference signal Cb or Cr. The number of pixels of a color difference signal in the vertical direction is half that of a luminance signal.

The IP converter (IP conversion module) 103 converts the input interlaced signal into a noninterlaced progressive signal, and outputs a 4:2:1 progressive color difference signal 104. Two color difference signals Cr and Cb are present. One of them is explained here.

The progressive color difference signal 104 is input to a diagonal correlation detector (diagonal correlation detection module) 105, and a pixel generator (pixel generation module) 107 which generates a output pixel in a correlative direction. The diagonal correlation detector (diagonal correlation detection module) 105 detects a diagonal correlation between pixels, and outputs a correlative direction detected signal 106.

The correlative direction detected signal 106 is input to the pixel generator 107. The pixel generator 107 generates a new pixel according to the correlative direction indicated by the correlative direction detected signal 106, at an appropriate output pixel position according to a top/bottom output field selection signal 109, and generates a 4:2:2 interlaced color signal output 108.

A luminance input signal 101 is delay adjusted by a delay device (delay module) 110 to have the same phase as a color difference signal output, and an interlaced luminance signal 111 is generated.

The top/bottom output field selection signal 109 is generated according to decoding control information included in an MPEG packet stream.

Figure 2:
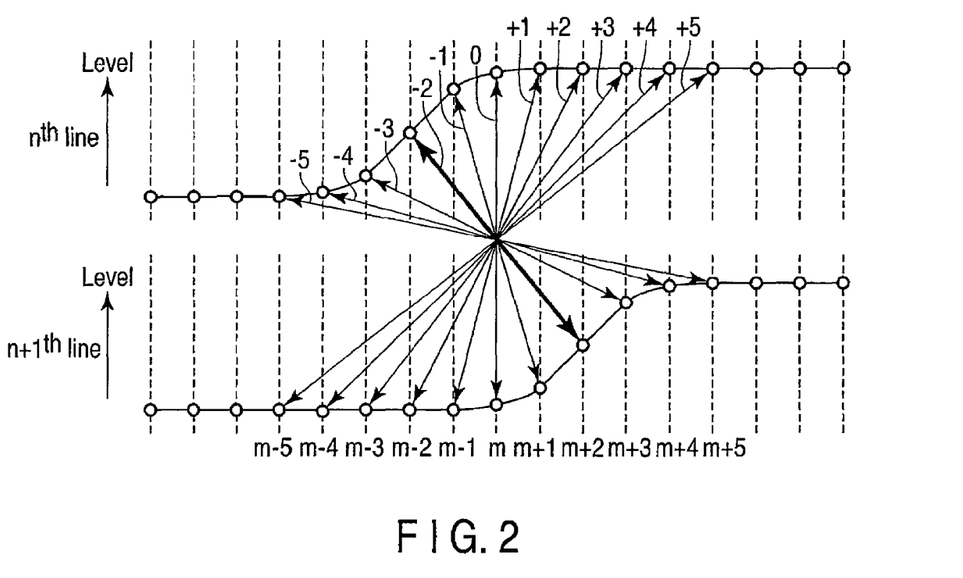
FIG. 2 shows a pixel array for explaining detection of a diagonal correlation of an image signal.

FIG. 2 shows waveforms for explaining an operation example of the diagonal correlation detector 105. The diagram shows detection of a diagonal correlation at an $m^{th}$ pixel position interpolated in the horizontal direction between an $n^{th}$ and an $n+1^{th}$ line in the vertical direction.

In FIG. 2, a pixel is indicated by a circle. The number of directions to search the correlation is 11 (the directions indicated by arrows) from −5 to +5 pixels along a time axis before and after the interpolated central $m^{th}$ pixel. In the example of FIG. 2, the correlation is the highest at an inclination of −2, for example. In this case, −2 is output as the correlative direction detected signal output 106.

Figure 3:
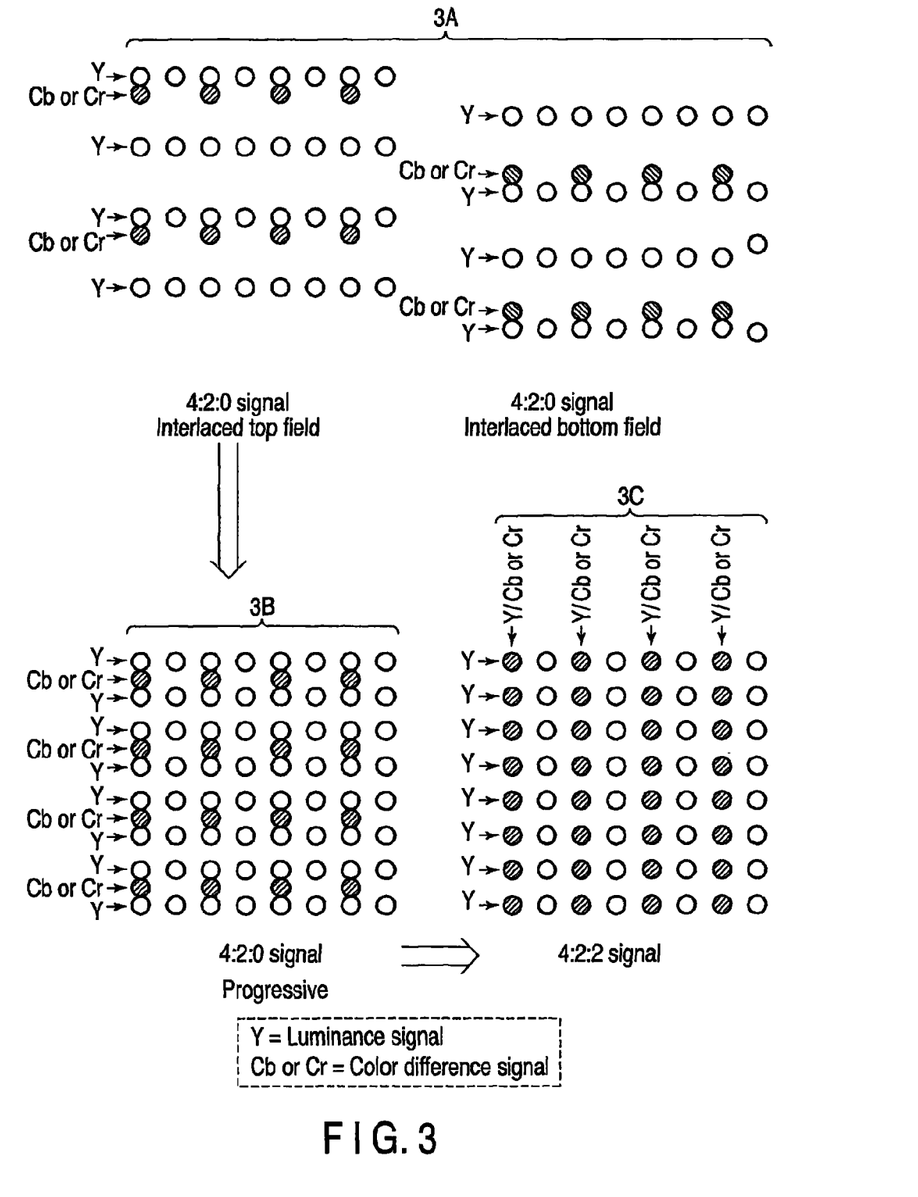
FIG. 3 is an explanatory diagram showing pixel arrays before and after conversion of a color difference signal format.

FIG. 3 shows ideal pixel positions of a color difference signal with respect to a luminance signal, when the format of a color difference signal is converted. A white circle indicates a pixel of a luminance signal, and a shaded circle indicates a pixel of a color difference signal. In FIG. 3, the upper pixel array 3A is a 4:2:0 format pixel array in interlaced top and bottom fields. The lower left pixel array 3B is a pixel array of a progressive signal. The lower right pixel array 3C is a pixel array of 4:2:2 format.

When both luminance signal and color difference signal are still image signals, the signals are converted into progressive signals by combining the pixel arrays in top and bottom fields. When both luminance signal and color difference signal are moving image signals, two pixels selected from the upper and lower lines of an interlaced signal are interpolated, the number of horizontal lines is increased, and the signals are converted into progressive signals.

The number of pixels used for interpolation is not limited to two, and more pixels may be used, or a pixel may be multiplied by a coefficient according to a moving image motion detection signal. In this embodiment, the basic principle is explained.

In FIG. 3, the progressive signal state 3B corresponds to a pixel position of a color difference signal in 4:2:0 format with respect to 8×8 pixels of a luminance signal, and state 3C corresponds to a pixel position of a color difference signal in 4:2:2 format. State 3C includes a position where the pixels of color difference signal and luminance signal are overlapped.

As described above, in an MPEG2 4:2:0 color difference signal, the number of pixels is half (one fourth) in both the horizontal and vertical directions, and an intermediate pixel position of a luminance signal is located in the vertical direction. In a 4:2:2 color difference signal, the number of pixels is half only in the horizontal direction, but a pixel position is located at the position overlapping with a luminance signal. Therefore, it is necessary to correct the pixel position for correctly converting 4:2:0 format into 4:2:2 format.

Figure 4:
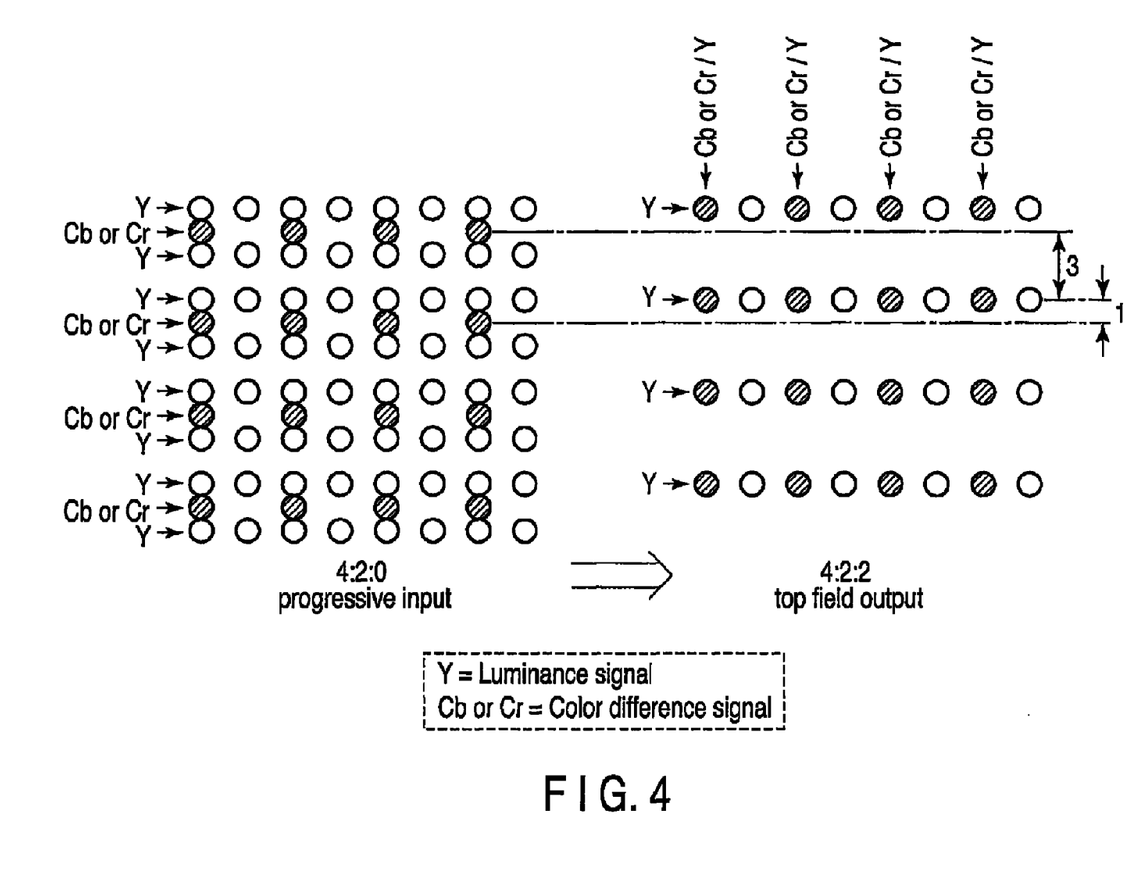
FIG. 4 is an explanatory diagram showing pixel arrays of a progressive signal and a color difference signal in a top field, after conversion of the signal formats.
Figure 5:
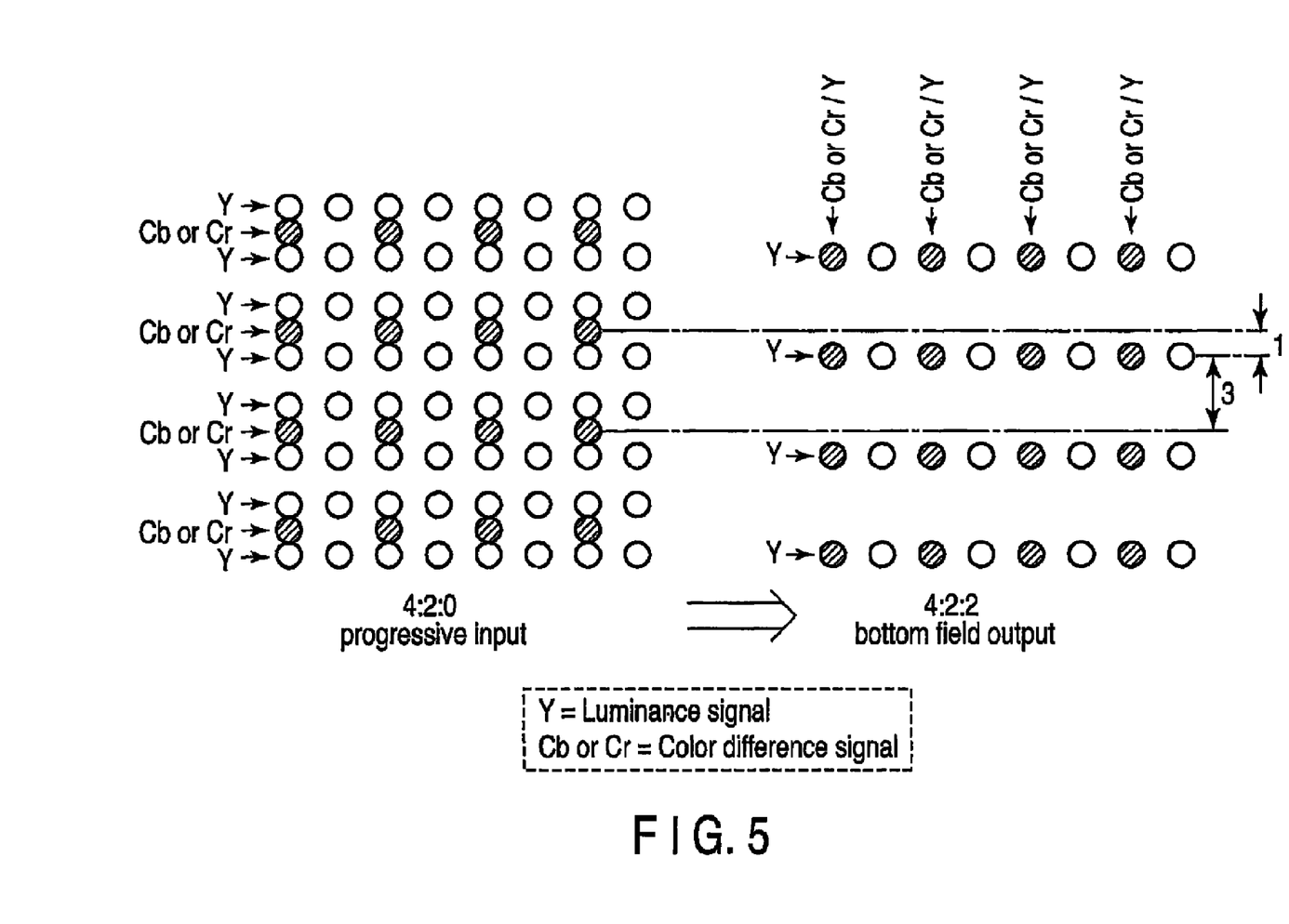
FIG. 5 is an explanatory diagram showing pixel arrays of a progressive signal and a color difference signal in a bottom field, after conversion of the signal formats.

FIG. 4 shows pixel positions in a top field of a 4:2:2 format interlaced signal with respect to a 4:2:0 format progressive signal input. FIG. 5 shows pixel positions in a bottom field of a 4:2:2 format interlaced signal.

As seen from the pixel positions in FIG. 4, when the pixels in the top field are output for the input 4:2:0 progressive color difference signal, the pixel position of the color difference signal is located at a position close to the lower horizontal line at a ratio of 3:1. Further, as seen from the pixel positions in FIG. 5, when the pixels in the bottom field are output, the pixel position of the color difference signal is located at a position close to the upper horizontal line at a ratio of 3:1.

Therefore, it is necessary to change the color output pixel generation method of the pixel generator 107 for a top field and a bottom field.

Figure 6:
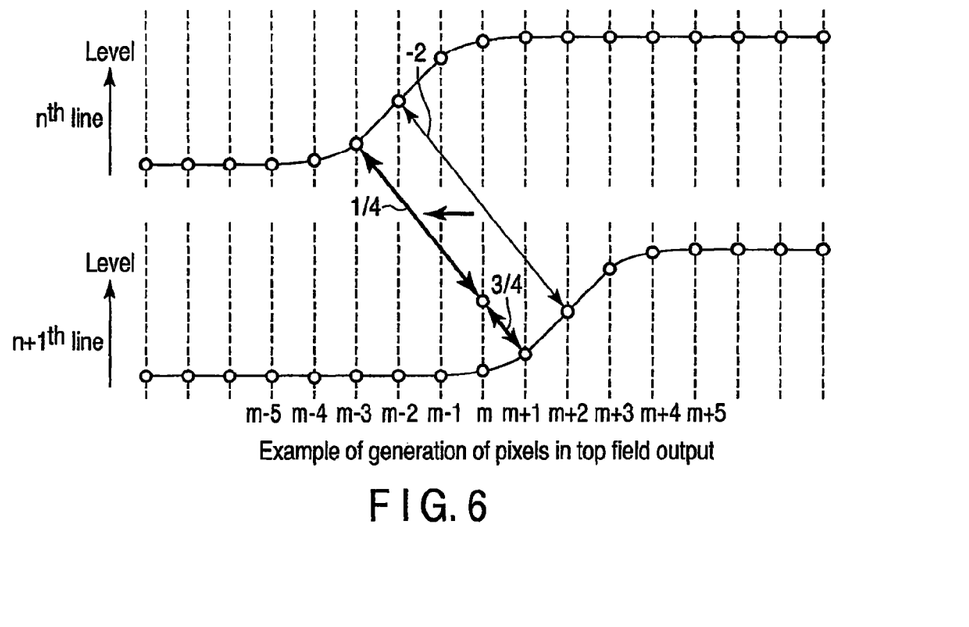
FIG. 6 is a diagram explaining an example of generation of pixels of a color difference signal in a top field, after conversion of the signal format.
Figure 7:
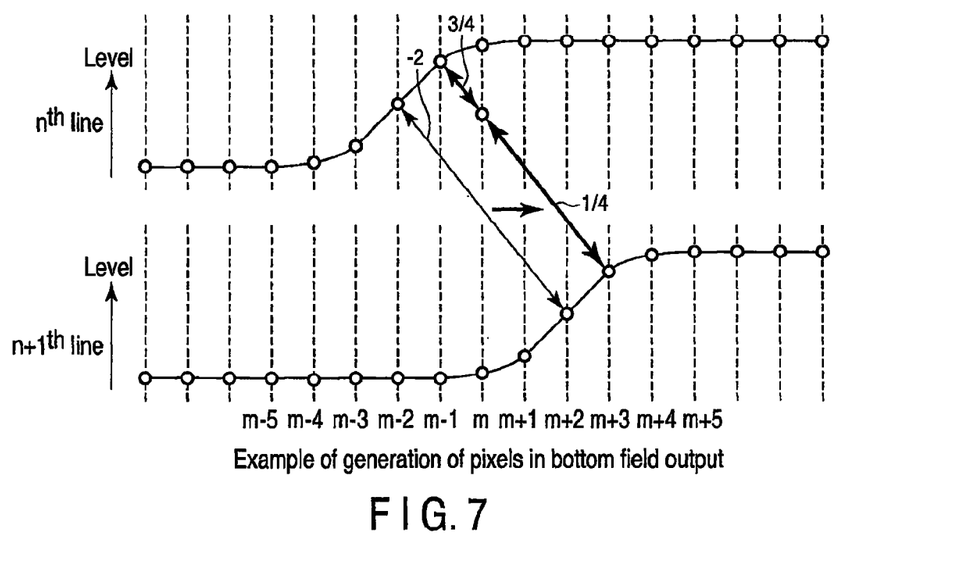
FIG. 7 is a diagram explaining an example of generation of pixels of a color difference signal in a bottom field, after conversion of the signal format.

FIG. 6 shows waveforms for explaining an operation example of the pixel generator 107 when generating a pixel in a top field. FIG. 7 shows waveforms for explaining an operation example of the pixel generator 107 when generating a pixel in a bottom field. The image data and correlative direction are assumed to be the same as in FIG. 2 in the following description.

In a top field, an interpolation position is close to the lower line at a ratio of 3:1, and a pixel of a horizontal $m^{th}$ pixel is calculated and generated by adding three fourths of an $m+1^{th}$ pixel in an $n+1^{th}$ line to one fourth of an $m-3^{th}$ pixel in an $n^{th}$ line. A pixel generated by a pixel earlier in time and parallel to a parallel position of a highest correlative pixel is calculated at a ratio to a pixel position in an $n+1^{th}$ line, and by weighting at a ratio of 3:1. As a result, the pixel can be generated as an output pixel (new pixel) in a top field at a correct pixel position.

When a correlative direction is detected, an $m+2^{th}$ pixel and an $m-2^{th}$ pixel are detected as highly correlative in FIG. 2. Therefore, basically, a new pixel may be generated by using the $m+2^{th}$ pixel and $m-2^{th}$ pixel.

However, actually, three fourths of an $m+1^{th}$ pixel and one fourth of an $m-3^{th}$ pixel are used. Because, when a new pixel is generated as a pixel in a top field, a pixel preferable and more correct in time can be obtained at an inclination of −2 and by using three fourths of an $m+1^{th}$ pixel and one fourth of an $m-3^{th}$ pixel, one pixel earlier in time, for example.

Similarly, in a bottom field, a pixel is generated by adding three fourths of an $m-1^{th}$ pixel in an $n^{th}$ line to one fourth of an $m+3^{th}$ in an $n+1^{th}$ line. A pixel generated by a pixel later in time and parallel to a parallel position of a highest correlative pixel along a time axis parallel to is calculated at a ratio to a pixel position in an $n^{th}$ line, and by weighting at a ratio of 3:1. As a result, the pixel can be generated as a new pixel in a bottom field at a correct pixel position.

Figure 8:
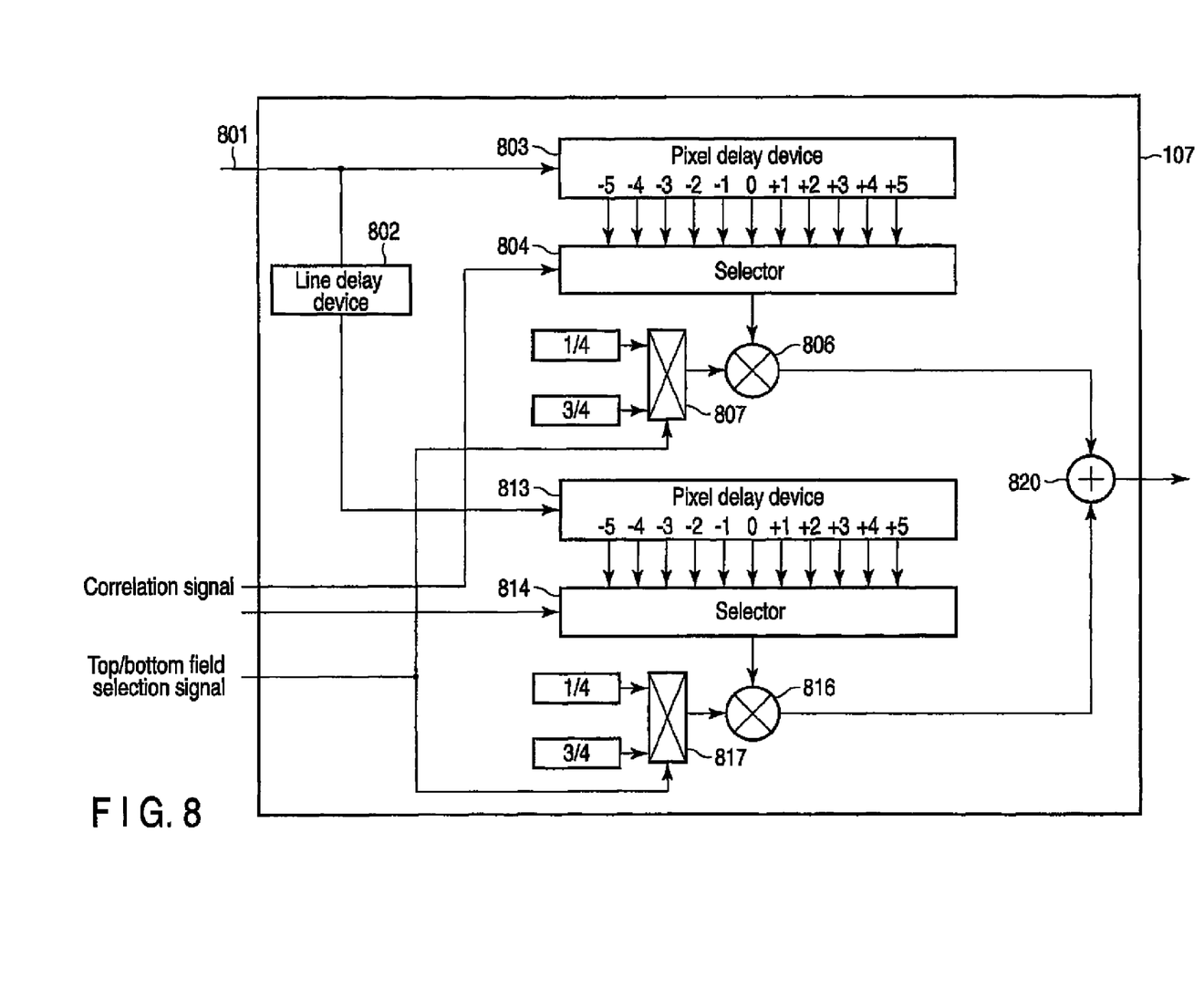
FIG. 8 is a diagram showing a configuration example of a pixel generator in FIG. 1.

FIG. 8 shows a configuration example of the image generator 107 shown in FIG. 1. A color difference signal is input to a line delay device 802 and a pixel delay device 803. The output of the line delay device 802 is input to the pixel delay device 813. The pixel delay devices 803 and 813 contain 11 pixels of opposing upper and lower horizontal lines. Of the pixels of the pixel delay devices 803 and 813, highly correlative pixels are selected by selectors 804 and 805 by using a correlation signal. In the above example, the highly correlative pixels are obtained by the combination of the $m+1^{th}$ pixel in the $n^{th}$ line and the $m-3^{th}$ pixel in the $n+1^{th}$ line (when the pixels in the top field are processed), and the $m-1^{th}$ pixel in the $n^{th}$ line and the $m+3^{th}$ pixel in the $n+1^{th}$ line (when the pixels in the bottom field are processed).

The pixels selected by selectors 804 and 805 are input to multipliers 806 and 816. Multipliers 806 and 816 multiply the pixels by a coefficient of ¼ or ¾ selected by selectors 804 and 805. When the pixels in the top field are processed, selector 807 selects ¼ as the coefficient, and selector 817 selects ¾ as the coefficient. When the pixels in the bottom field are processed, selector 807 selects ¾ as the coefficient, and selector 817 selects ¼ as the coefficient. The outputs of multipliers 806 and 816 are added by an adder 820, and output as phase offset corrected pixels.

Figure 9:
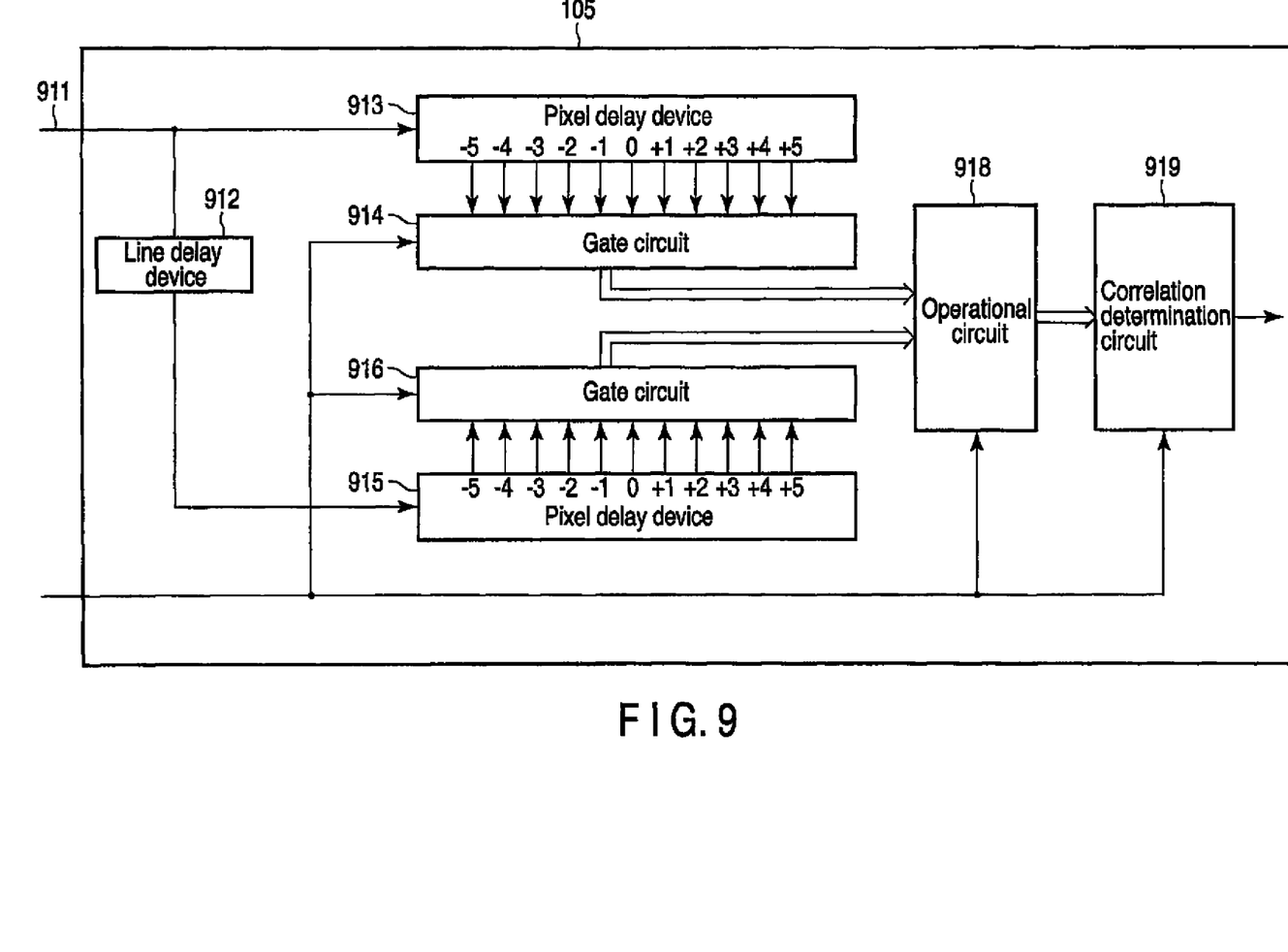
FIG. 9 is a diagram showing a configuration example of s diagonal correlation detection in FIG. 1.

FIG. 9 shows a configuration example of the diagonal correlation detector 105. A color difference signal is input to a line delay device 912 and a pixel delay device 913. The output of the line delay device 912 is input to a pixel delay device 915. The pixel delay devices 913 and 915 contain 11 pixels of opposing upper and lower horizontal lines. The pixels of the pixel delay devices 913 and 915 are input to gate circuits 914 and 916. The outputs of the gate circuits 914 and 916 are input to an operational circuit 918. The operational circuit 918 performs a subtraction between the pixels in the upper and lower lines, for example, to obtain a correlation between the pixels in 11 directions shown in FIG. 2. The results of 11 subtractions are input to a correlation determination circuit 919, and a smallest value is searched. The inclination of a line connecting two pixels providing smallest values is output as a correlation signal.

In the device described herein, correction of phase offset can be obtained for a pixel of a color difference signal, when the format of a color difference signal is converted. Therefore, a color difference signal has an appropriate offset after being converted, and the quality of a color image is improved.

The present invention is not limited to the embodiment described herein. The format conversion of a color difference signal shown in FIG. 1 can of course be realized by software. The invention is of course applicable to a color signal conversion device in a recording medium reproducing device, a set-top box, and a server, as well as a digital television signal receiving unit.

While certain embodiments have been described, these embodiments haven been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A color difference signal format conversion device comprising:
    an interlaced-to-progressive converter configured to convert an interlaced color difference signal, in which the number of pixels in a vertical direction of a color difference signal is half that of a luminance signal, into a progressive color difference signal;
    a diagonal correlation detector configured to detect a diagonal correlation of the progressive color difference signal, and obtain a correlative direction detected signal;
    a controller configured to output a field selection signal to determine whether the progressive color difference signal is a signal in a top or bottom field of the interlaced color difference signal; and
    a pixel generator configured to change a ratio between pixels of an $n^{th}$ and an $n+1^{th}$ line of the progressive color difference signal according to the field selection signal, when generating a new pixel by using corresponding pixels of the $n^{th}$ and $n+1^{th}$ lines based on the correlative direction detected signal.

2. The color difference signal format conversion device of claim 1, wherein
    the pixel generator generates the new pixel by using pixels in upper and lower lines at a position earlier in time than a horizontal position of highest correlative pixels in upper and lower lines between pixels in the $n^{th}$ and $n+1^{th}$ lines, when processing in a top field, and generates the new pixel by using pixels in upper and lower lines at a position later in time than a horizontal position of highest correlative pixels in upper and lower lines between pixels in the $n^{th}$ and $n+1^{th}$ lines, when processing in a bottom field.

3. The color difference signal format conversion device of claim 1, wherein
    the pixel generator multiplies a pixel in the $n^{th}$ line by a coefficient of $1/4$, and a pixel in the $n+1^{th}$ line by a coefficient of $3/4$, when processing in a top field, and multiplies a pixel in the $n^{th}$ line by a coefficient of $3/4$, and a pixel in the $n+1^{th}$ line by a coefficient of $1/4$, when processing in a bottom field.

4. The color difference signal format conversion device of claim 2, wherein
    the pixel generator multiplies a pixel in the $n^{th}$ line by a coefficient of $1/4$, and a pixel in the $n+1^{th}$ line by a coefficient of $3/4$, when processing in a top field, and multiplies a pixel in the $n^{th}$ line by a coefficient of $3/4$, and a pixel in the $n+1^{th}$ line by a coefficient of $1/4$, when processing in a bottom field.

5. A color difference signal format conversion method, in a digital television signal processing unit, comprising:
    converting an interlaced color difference signal, in which the number of pixels in a vertical direction of an interlaced color difference signal is half that of a luminance signal, into a progressive color difference signal;
    detecting a diagonal correlation of the progressive color difference signal, and obtaining a correlative direction detected signal;
    obtaining a field selection signal to determine whether the progressive color difference signal is a signal in a top or bottom field of the interlaced color difference signal; and
    changing the ratio between pixels of an $n^{th}$ and an $n+1^{th}$ line of the progressive color difference signal according to the field selection signal, when generating a new pixel by selecting and adding corresponding pixels of the $n^{th}$ and $n+1^{th}$ lines based on the correlative direction detected signal.

6. The color difference signal format conversion device of claim 1, wherein
    the color difference signal is obtained from a television signal.

7. The color difference signal format conversion device of claim 2, wherein
    the color difference signal is obtained from a television signal.

8. The color difference signal format conversion device of claim 3, wherein
    the color difference signal is obtained from a television signal.

9. The color difference signal format conversion device of claim 4, wherein
    the color difference signal is obtained from a television signal.

* * * * *